*United States Patent Office*

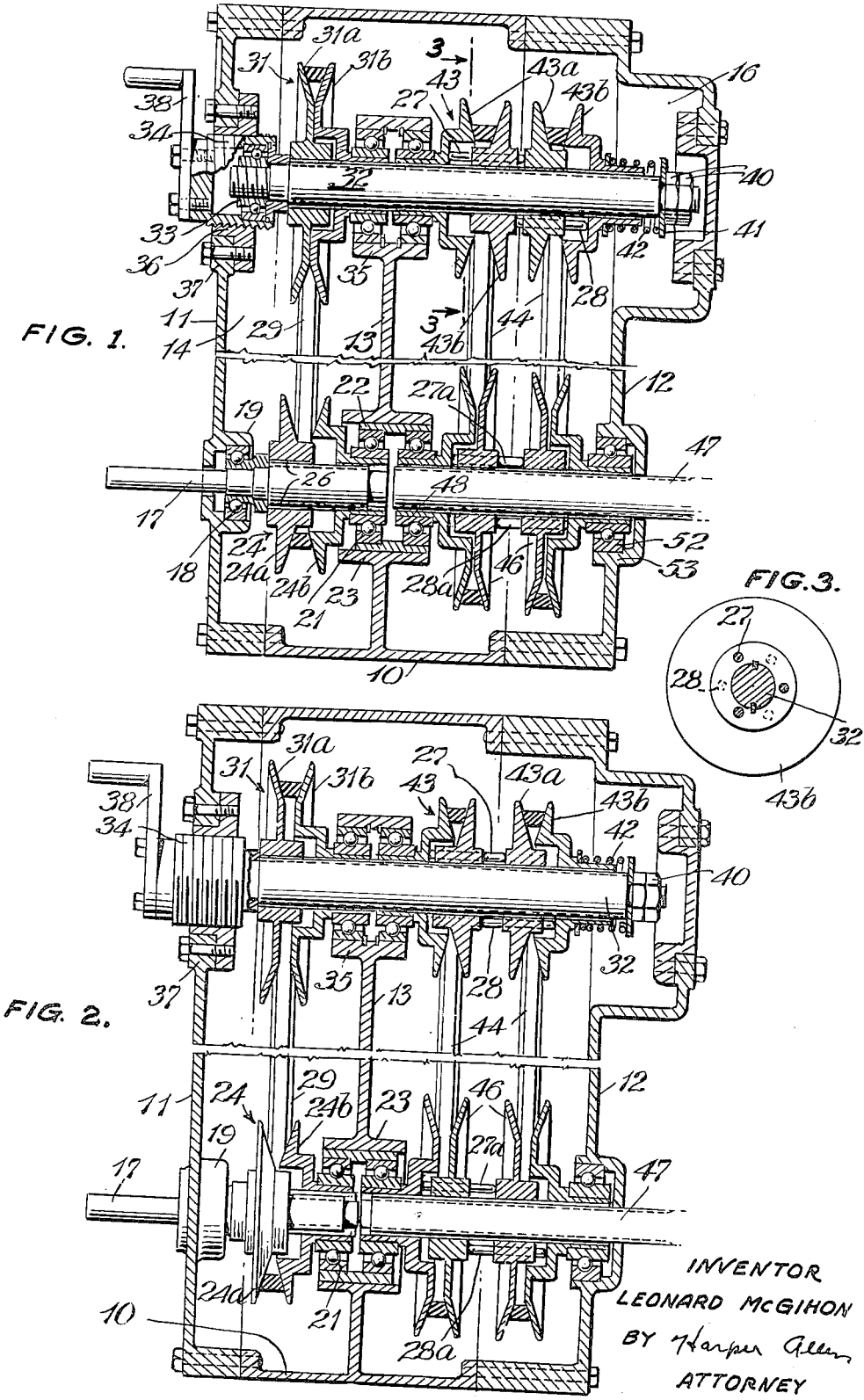

2,731,845
Patented Jan. 24, 1956

2,731,845

VARIABLE DRIVE MECHANISM

Leonard McGihon, San Leandro, Calif., assignor to King Sales & Engineering Co., as trustee, San Francisco, Calif., a corporation of California Application October 11, 1952, Serial No. 314,337

3 Claims. (Cl. 74—230.17)

The present invention relates to variable drive mechanisms and is concerned more particularly with a provision of a drive mechanism of the above character in which a double stage reduction is provided in the variable drive providing for the use of a plurality of V-belts of standard character in the secondary drive and for automatic compensation of belt tension between the respective drive sections.

Other objects and advantages of the invention will be apparent from the following description of a preferred embodiment thereof as illustrated in the accompanying drawings, in which:

Figure 1 is a vertical sectional view through a variable drive mechanism embodying the invention.

Figure 2 is a sectional view similar to Figure 1 but showing a different setting of the mechanism.

Figure 3 is a detail section taken as indicated by the line 3—3 of Figure 1.

Referring to Figure 1, there is illustrated a casing 10 having respective end plates or walls 11 and 12 secured thereto. Within the casing there is an intermediate wall section 13 dividing the space within the casing into respective compartments for a primary drive unit section 14 and a secondary drive unit section 16.

The drive unit includes a drive shaft 17 adapted for connection to a suitable source of power and journalled at one end by a bearing 18 in a bearing housing 19 of the end plate 11 and at the other end by a bearing 21 in a floating bearing cage or mounting sleeve 22, referred to hereinafter, slidably mounted in a boss 23 of the intermediate wall 13. The drive shaft 17 has keyed thereon a variable drive pulley 24 keyed thereon by upper and lower keys 26. The left-hand pulley member 24a is keyed in fixed position on the shaft, the right-hand pulley member 24b floating on the shaft.

The pulley 24 is connected by a conventional V-belt 29 with a driven pulley 31 of the primary stage of the drive, comprising pulley section 31a stationary with respect to the intermediate drive shaft 32 and pulley section 31b slidably and non-rotatably mounted thereon. The shaft 32 is journalled at its left end in a bearing 33 supported in a threaded bearing cage 34 engaged within a threaded insert collar 36 in the boss 37 of the end wall 11. The bearing cage 34 has a handle 38 mounted thereon so that it can be threaded inwardly and outwardly to axially displace the shaft 32 during rotation thereof. The right hand pulley section 31b is journalled by a bearing in a boss 35 of wall 13.

In the secondary stage of the drive the shaft 32 in the secondary drive section 16 carries two secondary drive pulleys 43 similarly keyed to the shaft 32 and interconnected by three pins 27 interposed between the annular faces of the pulley sections 43a and passing freely through the left-most pulley section 43b interposed therebetween. Correspondingly, the right-hand pulley section 43a is apertured to pass pins 28 interconnecting pulley sections 43b of the respective pulleys 43.

The outboard or right end of shaft 32 is of reduced size and is threaded to receive nuts 40 and a stop washer 41 between which and the adjacent pulley section 43b a spring 42 is interposed to maintain the tension of the belts.

The drive pulleys 43 are connected by conventional V-belts 44 with the driven pulleys 46 of the secondary stage which are keyed on a driven shaft 47 journalled at its left end in a bearing 48 in the floating bearing cage 22. The respective fixed and movable sections of the pulleys 46 are similar in construction and operation to the pulleys 43, abutment pins 27a and 28a being employed in the same manner as pins 27 and 28 of drive pulleys 43. The right end of the driven shaft 47 is journalled by a bearing 52 in a bearing cage portion 53 of the end wall 12 and extends outside of the case to provide an output drive.

The above arrangement it will be noted provides one set of pulleys in the primary speed reduction stage of the drive and two sets of pulleys in the secondary speed reduction stage of the drive with all of the pulleys employing V-belts of the same size and the same strength. Assuming a four to one reduction within the drive, the number of pulley sets in the secondary stage should be twice the number of pulley sets in the primary stage, while if the permissible maximum speed reduction is nine to one, then the ratio between the number of pulleys in the primary stage and the secondary stage would be three, i. e., the square root of the speed reduction. By following this formula at the maximum loading permitted in the system, the pounds pull on each belt is equal in both the primary and secondary stages, so that with this uniform belt loading any number of pulley sets and belts can be employed in either section to transmit the required horsepower without the possibility of overloading any one belt.

While I have shown and described a preferred embodiment of the invention, it is capable of variation from the form shown, so that its scope should be limited only by the scope of the claims appended hereto.

I claim:

1. In a multiple stage variable drive mechanism, a housing having two compartments, a wall in said housing between said compartments and having spaced parallel bosses, a first stage drive shaft journalled in said housing in one of said compartments, a variable drive pulley on said drive shaft comprising a section fixed against axial movement with respect to said drive shaft and a movable section mounted for axial shifting movement, a bearing for said movable section and said drive shaft, a mounting sleeve for said bearing slidably mounted in one of said bosses, a second shaft journalled in the other said bosses and having an endwise adjustable connection to said housing, a variable drive pulley on said second shaft, a V-belt connecting said respectively variable drive pulleys, said second shaft extending freely through said second boss and having a plurality of variable drive pulleys mounted thereon in the other of said compartments, one section of each of said plurality of variable drive pulleys being held against axial movement and the other section of each of said variable drive pulleys being mounted for axial movement with respect to said second shaft, means interconnecting said movable pulley sections of said plurality of pulleys, spring means interposed between said shaft and said movable sections of said plurality of variable drive pulleys, a third shaft journalled in said housing in axial alignment with said first shaft, and a plurality of variable drive pulleys carried by said third shaft including respective sections fixed against axial movement and respective sections connected together for axial movement on said shaft, one of said last named sections having a bearing mounted in said mounting sleeve.

2. A variable drive mechanism as described in claim 1 in which each plurality of variable drive pulleys includes abutment pins interposed between the respective fixed sections and also between the respective movable sections thereof respectively.

3. A variable drive mechanism as recited in claim 1 in which the belts interconnecting said respective pulleys are all of the same size.

References Cited in the file of this patent

UNITED STATES PATENTS

| | | |
|---|---|---|
| 1,926,269 | Easter | Sept. 12, 1933 |
| 2,433,150 | Palm | Dec. 23, 1947 |
| 2,478,870 | Heyer | Aug. 9, 1949 |